(12) United States Patent
Shigeno

(10) Patent No.: US 6,688,981 B2
(45) Date of Patent: Feb. 10, 2004

(54) GAME SYSTEM, JUDGMENT TABLE PRODUCING METHOD, AND COMPUTER-READABLE STORAGE MEDIUM CARRYING GAME PROGRAM

(75) Inventor: Kenichirou Shigeno, Tokyo (JP)

(73) Assignee: Konami Computer Entertainment Japan, Inc., Tokyo (JP)

( * ) Notice: Subject to any disclaimer, the term of this patent is extended or adjusted under 35 U.S.C. 154(b) by 0 days.

(21) Appl. No.: 09/842,906

(22) Filed: Apr. 26, 2001

(65) Prior Publication Data

US 2001/0036852 A1 Nov. 1, 2001

(30) Foreign Application Priority Data

Apr. 28, 2000 (JP) .................................... 2000-129836

(51) Int. Cl.$^7$ ................................................ A63F 13/00
(52) U.S. Cl. ........................................ 463/32; 463/30
(58) Field of Search ................................. 463/30–35, 1, 463/15; 345/427, 473; 273/317, 108, 153 R, 153 S, 153 J

(56) References Cited

U.S. PATENT DOCUMENTS

| | | | |
|---|---|---|---|
| 4,600,200 A | * | 7/1986 | Oka et al. .................... 463/33 |
| RE35,314 E | * | 8/1996 | Logg ............................ 463/2 |
| 6,017,272 A | | 1/2000 | Rieder |
| 6,126,545 A | * | 10/2000 | Takahashi et al. .......... 463/32 |
| 6,267,674 B1 | * | 7/2001 | Kondo et al. ................ 463/32 |

FOREIGN PATENT DOCUMENTS

| | | |
|---|---|---|
| EP | 0 786 742 | 7/1997 |
| EP | 0 933 105 | 1/2000 |

OTHER PUBLICATIONS

Syphon Filter. Release Date: Feb. 17, 1999 by Sony, Syphon Filter Product Info [www.videogamereview.com/review/Sony_Playstation/Action/moreinfo_97.asp], pp. 1–2.*
Syphon Filter Reviews of the game by players [www.videogamereview.com/review/Sony_Playstation/Action/Action-97.asp]. pp. 1–20.*

* cited by examiner

Primary Examiner—Mark Sager
Assistant Examiner—Aaron Capron
(74) Attorney, Agent, or Firm—Jordan and Hamburg LLP

(57) ABSTRACT

A game system includes: a storage device for storing data of imaginary game field constituted by a plurality of areas to be displayed in scenes of game; and a control device for advancing the game according a predetermined program and reading out the data of the imaginary game field from the storage device to produce images to be displayed. The control device includes: a judgment table producing unit for judging whether or not a character located in an area is within a visual field of another character located in another area for all areas in the imaginary game field in which the character can be located, when the data of the imaginary game field is read out, and for producing judgment tables based on judgment results; and a unit for controlling action of the character located in the areas of the imaginary game field based on the judgment tables.

19 Claims, 9 Drawing Sheets

GAME SYSTEM, JUDGMENT TABLE PRODUCING METHOD, AND COMPUTER-READABLE STORAGE MEDIUM CARRYING GAME PROGRAM

BACKGROUND OF THE INVENTION

1. Field of the Invention

This invention relates to a game system which reads out data of an imaginary game field constituted by a plurality of areas to be displayed in various scenes during the game and produces display images. This invention also relates to a judgment table producing method for producing the judgment table used in the game system, and a computer-readable storage medium carrying the game program.

2. Description of Related Art

As a game system of this kind, there is known a game system which displays a battle field including obstacles such as walls and/or fences on a screen of a display device. The game system provides such an imaginary experience that a character controlled by a user fights with enemy characters by weapons or advances to a destination with hiding himself behind the obstacles. In the game system, the computer of the game system calculates whether or not the character controlled by the user (hereinafter referred to as "player-character") enters the imaginary visual field of the enemy character controlled by the computer. If the computer judges that the player-character enters the imaginary visual field of the enemy character, the computer controls the action of the enemy character after calculating the shortest distance from the enemy character to the player-character and/or calculating the area where the enemy character can avoid the attack with weapon by the player-character.

However, in such a game system, since the positional relationship between the player-character and the enemy character is calculated every time the character is moved, the computer's processing load is quite high. Especially, when a plurality of enemy characters are displayed and moved simultaneously within the imaginary game field, the processing load increases, and hence it is difficult to achieve quick and appropriate action of the enemy characters.

SUMMARY OF THE INVENTION

It is an object of the present invention to provide a game system in which the processing load of the computer is reduced and the characters in the game can make quick and appropriate action.

It is another object of the present invention to provide a judgment table producing method for the above game system.

It is still another object of the present invention to provide a computer-readable storage medium carrying the game program and suitably used by the above game system.

According to one aspect of the present invention, there is provided a game system including: a storage device for storing data of imaginary game field constituted by a plurality of areas to be displayed in scenes of game; and a control device for advancing the game according to a predetermined program and reading out the data of the imaginary game field from the storage device to produce images to be displayed, wherein the control device includes: a judgment table producing means for judging whether or not an imaginary visual filed of a character located in an area includes another character located in another area, for each area of all areas in the imaginary game field in which the character can be located, when the data of the imaginary game field is read out, and for producing judgment tables based on judgment results; and a unit for controlling action of the character located in the areas of the imaginary game field based on the judgment tables.

In accordance with the game system thus configured, when the data of the imaginary game field is read out, it is judged whether or not a character located in an area can be seen by another character located in another area. This judgment is performed for all other areas of the imaginary game field in which the character can be located. The one area of the imaginary game field is changed one by one, and the judgment is executed to produce judgment tables. The control unit controls the action of the character based on the judgment tables. Therefore, it is unnecessary for the control unit to calculate the imaginary visual relation of the characters every time. The control unit can obtain information on the imaginary visual relation of the characters, e.g., the character in which area is visible or invisible, and in which area the character can hide himself, etc. Thus, the character's action can be rapidly and appropriately controlled with reduced calculation load.

Preferably, the judgment table producing unit may include: a first unit for selecting one of the areas of the imaginary game field in which the character can be located as a judgment start zone and for selecting one of a plurality of coordinate points within the judgment start zone as a judgment start point; a second unit for selecting one of the areas of the imaginary game field, which is other than the one selected as the judgment start zone and in which the character can be located, as an evaluation zone and for selecting a predetermined number of coordinate points within the evaluation zone as evaluation points; a third unit for judging, for the respective evaluation points, whether or not any obstacle exists on a straight line from the judgment start point to the evaluation point; a fourth unit for recording the evaluation points, for which the judgment result by the third unit indicates that obstacle exists on the straight line, as a point which is out of an imaginary visual field of the character located at the judgment start point and for recording the evaluation points, for which the judgment result by the third unit indicates that obstacle does not exist on the straight line, as a point which is within the imaginary visual field of the character located at the judgment start point; a fifth unit for selecting, in turn, all of the areas of the imaginary game field, which are other than the one selected as the judgment start zone and in which the character can be located, as the evaluation zone, and for selecting, in turn, all of the areas of the imaginary game field in which the character can be located as the judgment start zone; and a sixth unit for producing the judgment tables based on results of the recording by the fourth unit after all of the areas of the imaginary game field are selected as the judgment start zone.

By this, one of the areas of the imaginary game field, in which the character can be located, is selected as the judgment start zone, and a predetermined coordinate point in the judgment start zone is selected as a judgment start point. In addition, one of the areas of the imaginary game field, which are other than the one selected as the judgment start zone and in which the character can be located, is selected as the evaluation zone, and predetermined number of coordinate points in the evaluation zone are selected as the evaluation points. Then, for the respective evaluation points, it is determined if any obstacle exists on the straight line between the judgment start point and the evaluation point. If the obstacle exists, the evaluation point is recorded as out of the visual field. If the obstacle does not exist, the evaluation point is recoded as within the visual field. After the judgment and recording are completed for all areas of the imaginary game field, the judgment tables are produced.

The judgment start point in the judgment start zone may include a position of an imaginary viewpoint of the character when the character takes high posture at the predetermined coordinate position in the judgment start zone. The predetermined coordinate point in the judgment start zone may include a central coordinate point within the judgment start zone. Thus, actual judgment table may be produced.

The evaluation point in the evaluation zone may include a point of imaginary viewpoint of the character when the character takes a high posture at the coordinate point in the evaluation zone. Alternatively, the evaluation point in the evaluation zone may include a point of an imaginary viewpoint of the character when the character takes a low posture at the coordinate point in the evaluation zone. The judgment table producing unit may execute the judgment based on the imaginary viewpoints of the character when the character takes the high posture and the low posture at the coordinate point in the evaluation zone. Thus, the judgment table may be produced in consideration of various actions of the characters.

The evaluation zone may have a rectangular shape, and the predetermined number of coordinate points in the evaluation zone may include coordinate points of four corners of the evaluation zone having rectangular shape.

An imaginary height of the judgment start zone and an imaginary height of the evaluation zone within the imaginary game field may be different from each other. Thus, if the imaginary game field has difference in height, the judgment tables may be appropriately used.

According to another aspect of the present invention, there is provided a judgment table producing method for a game system which reads out data of imaginary game field constituted by a plurality of areas to be displayed in scenes of game to produce images to be displayed and controls action of character located in the areas of the imaginary game field based on produced judgment table when the data of the imaginary game field is read out, the method including the steps of: selecting one of the areas of the imaginary game field in which the character can be located as a judgment start zone, and selecting one of a plurality of coordinate points within the judgment start zone as a judgment start point; selecting one of the areas of the imaginary game field, which is other than the one selected as the judgment start zone and in which the character can be located, as an evaluation zone, and selecting a predetermined number of coordinate points within the evaluation zone as evaluation points; judging, for the respective evaluation points, whether or not any obstacle exists on a straight line from the judgment start point to the evaluation point; recording the evaluation points, for which the judgment result indicates that obstacle exists on the straight line, as a point which is out of an imaginary visual field of the character located at the judgment start point, and recording the evaluation points, for which the judgment result indicates that obstacle does not exist on the straight line, as a point which is within the imaginary visual field of the character located at the judgment start point; selecting, in turn, all of the areas of the imaginary game field, which are other than the judgment start zone and in which the character can be located, as the evaluation zone, and selecting, in turn, all of the areas of the imaginary game field in which the character can be located as the judgment start zone; and producing judgment tables based on results of the recording by the recording step after all of the areas of the imaginary game field are selected as the judgment start zone.

By this method, it is unnecessary to calculate the imaginary visual relation of the characters every time the character is moved, and information on the imaginary visual relation of the characters, e.g., the character in which area is visible or invisible, and in which area the character can hide himself, etc., can be readily obtained. Thus, the character's action can be rapidly and appropriately controlled with reduced calculation load.

According to another aspect of the present invention, there is provided a computer-readable storage medium carrying a program which allows a computer in a game system to read out data of imaginary game field constituted by a plurality of areas to be displayed in scenes of game from a storage device to display images, the program controls the computer to function as: a judgment table producing unit for judging whether or not a character located in an area is within a visual field of another character located in another area, for all areas of the imaginary game field in which the character can be located, when the data of the imaginary game field is read out, and for producing judgment tables based on judgment results; and a unit for controlling action of the character located in the areas of the imaginary game field based on the judgment tables.

In accordance with the storage medium thus configured, by executing the program by the computer, the computer may function as the game system of the present invention.

Preferably, the judgment table producing unit may include: a first unit for selecting one of the areas of the imaginary game field in which the character can be located as a judgment start zone and for selecting one of a plurality of coordinate points within the judgment start zone as a judgment start point; a second unit for selecting one of the areas of the imaginary game field, which is other than the one selected as the judgment start zone and in which the character can be located, as an evaluation zone and for selecting a predetermined number of coordinate points within the evaluation zone as evaluation points; a third unit for judging, for the respective evaluation points, whether or not any obstacle exists on a straight line from the judgment start point to the evaluation point; a fourth unit for recording the evaluation points, for which the judgment result by the third unit indicates that obstacle exists on the straight line, as a point which is out of an imaginary visual field of the character located at the judgment start point and for recording the evaluation points, for which the judgment result by the third unit indicates that obstacle does not exist on the straight line, as a point which is within the imaginary visual field of the character located at the judgment start point; a fifth unit for selecting, in turn, all of the areas of the imaginary game field, which are other than the one selected as the judgment start zone and in which the character can be located, as the evaluation zone and for allowing the judging unit to judge and the recording unit to record, and for selecting, in turn, all of the areas of the imaginary game field in which the character can be located as the judgment start zone; and a sixth unit for producing the judgment tables based on results of the recording by the fourth unit after all of the areas of the imaginary game field are selected as the judgment start zone.

By this, one of the areas of the imaginary game field, in which the character can be located, is selected as the judgment start zone, and a predetermined coordinate point in the judgment start zone is selected as a judgment start point. In addition, one of the areas of the imaginary game field, which are other than the one selected as the judgment start zone and in which the character can be located, is selected as the evaluation zone, and predetermined number of coordinate points in the evaluation zone are selected as the evaluation points. Then, for the respective evaluation points, it is determined if any obstacle exists on the straight line between the judgment start point and the evaluation point. If the obstacle exists, the evaluation point is recorded as out of the visual field. If the obstacle does not exist, the evaluation point is recoded as within the visual field. After the judgment and recording are completed for all areas of the imaginary game field, the judgment tables are produced.

The judgment start point in the judgment start zone may include a position of an imaginary viewpoint of the character when the character takes high posture at the predetermined coordinate position in the judgment start zone. The predetermined coordinate point in the judgment start zone may include a central coordinate point within the judgment start zone. Thus, actual judgment table may be produced.

The evaluation point in the evaluation zone may include a point of imaginary viewpoint of the character when the character takes a high posture at the coordinate point in the evaluation zone. Alternatively, the evaluation point in the evaluation zone may include a point of an imaginary viewpoint of the character when the character takes a low posture at the coordinate point in the evaluation zone. The judgment table producing unit may execute the judgment based on the imaginary viewpoints of the character when the character takes the high posture and the low posture at the coordinate point in the evaluation zone. Thus, the judgment table may be produced in consideration of various actions of the characters.

The evaluation zone may have a rectangular shape, and the predetermined number of coordinate points in the evaluation zone may include coordinate points of four corners of the evaluation zone having rectangular shape.

An imaginary height of the judgment start zone and an imaginary height of the evaluation zone within the imaginary game field may be different from each other. Thus, if the imaginary game field has difference in height, the judgment tables may be appropriately used.

It is noted that the storage medium may be of various form such as a magnetic storage medium, an optical storage medium, a magneto-optical storage medium, and a semiconductor storage medium.

The nature, utility, and further features of this invention will be more clearly apparent from the following detailed description with respect to preferred embodiment of the invention when read in conjunction with the accompanying drawings briefly described below.

DETAILED DESCRIPTION OF THE PREFERRED EMBODIMENTS

The preferred embodiment of the present invention will now be described below with reference to the attached drawings.

Figure 1:
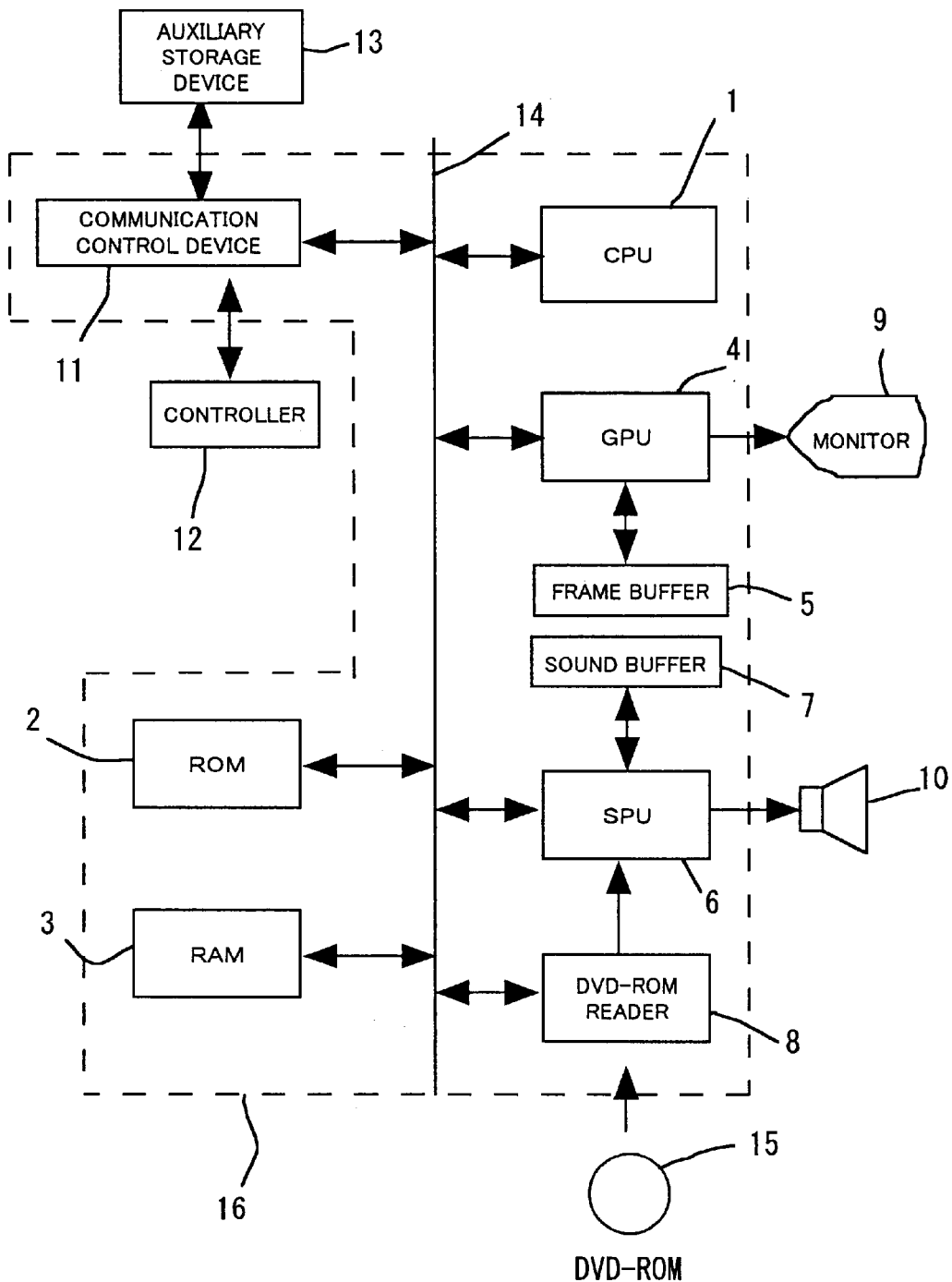
FIG. 1 is a block diagram showing a configuration of a game system according to the present invention.

FIG. 1 is a block diagram showing a control unit of a home-use game system to which the present invention is applied. The home-use game system executes a predetermined game according to game program recorded on a DVD-ROM 15 serving as a storage medium.

This game system includes a CPU (computer) 1 mainly constituted by a microprocessor, a ROM 2 and a RAM 3 serving as main storage devices for the CPU 1, a Graphics Processing Unit (GPU) 4 for image processing, a Sound Processing Unit (SPU) 6 for sound processing, buffers 5 and 7 for those processing units, and a DVD-ROM reading device 8. In the ROM 2, an operation system which is a program necessary for the overall control of the game system is written. In the RAM 3, the program and/or data of the game read-out from the DVD-ROM 15 serving as a storage medium are written as needed. The GPU 4 receives image data from the CPU 1 to draw game images on the frame buffer 5, converts the drawn image data into a video reproduction signal and supplies it to the monitor 9 at appropriate timings. The SPU 6 reproduces audio and/or sound data as well as music source data, which are read out from the DVD-ROM 15 and stored in the sound buffer 7, to output the sound from the speaker 10. The DVD-ROM reading device 8 reads out the program and/or data recorded on the DVD-ROM 15 in response to the instruction from the CPU 1, and outputs the signal corresponding to the read-out contents. Generally, the monitor 9 may be a home-use television receiver, and the speaker 10 may be a built-in speaker of the television receiver.

The CPU 1 is connected with a communication control device 11 via the bus 14, and the controller 12 and the auxiliary storage device 13 are detachably connected to the communication control device 11. The controller 12 functions as an input device, and is equipped with operation members to be manipulated by the user. The operation members includes direction instruction switches for moving the player-character within an imaginary game field and/or selecting items such as weapons, and various push-button switches for making the player-character use the weapons in the game story. The communication control device 11 scans the operational status of the operation members on the controller 12 with a predetermined interval (e.g., 1/60 sec.), and outputs a signal corresponding to the scan result to the CPU 1. The CPU 1 judges the operational status of the controller 12 based on the signal. A plurality of controllers 12 and auxiliary storage devices 13 may be connected to the communication control device 11 in parallel.

With the above configuration, the elements other than the monitor 9, the speaker 10, the controller 12, the DVD-ROM 15 and the auxiliary storage device 13 are integrally accommodated in a housing to constitute a game machine body 16.

In this embodiment, the DVD-ROM 15 carries program necessary for the game system to execute battle action game, image data corresponding to various scenes appearing in the progress of the game and audio data corresponding to the voice and/or sound to be reproduced at each scene. In this battle action game, the user controls the player-character to move with hiding it from the enemy characters and to fight with the enemy characters with weapons as necessary.

Figure 2:
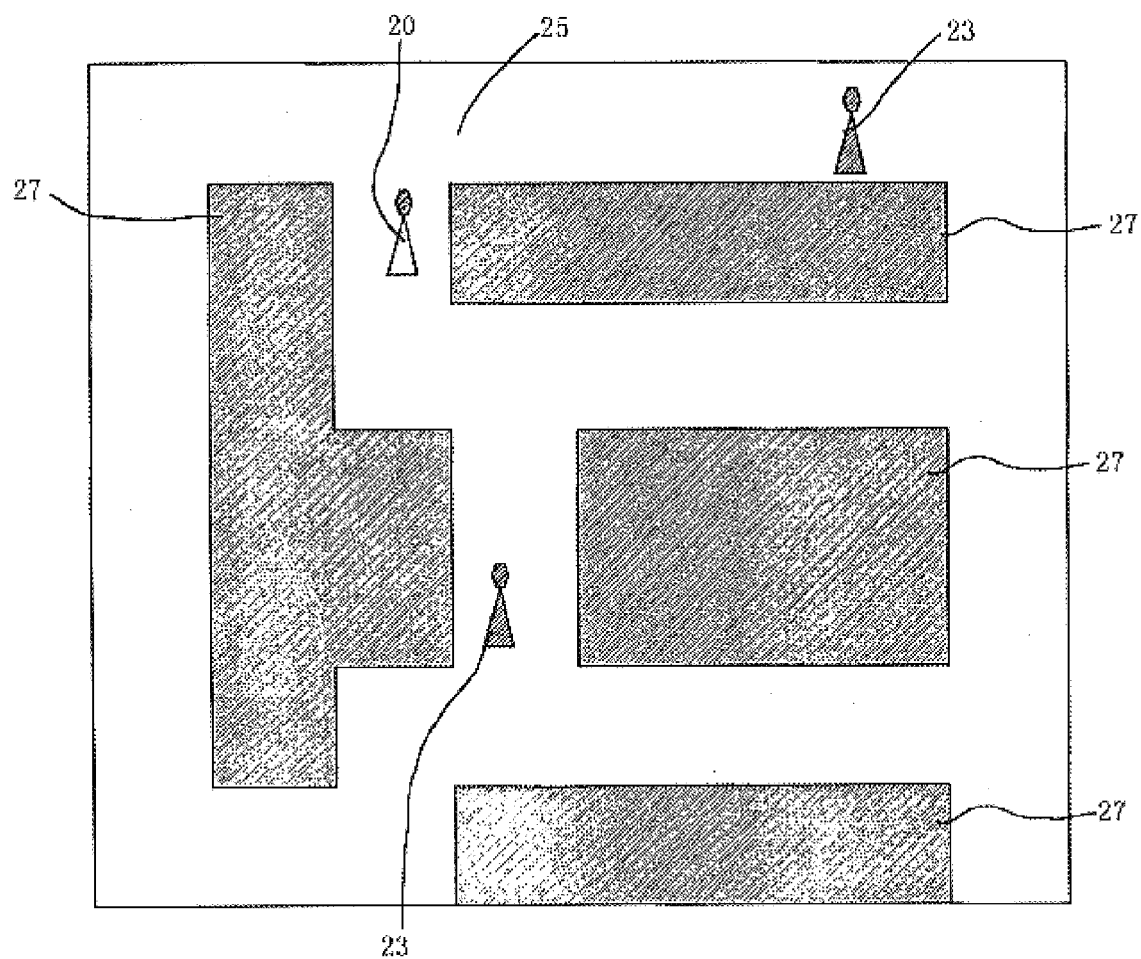
FIG. 2 is an example of a topographical image shown on a monitor when a battle action game is executed by the game system of the present invention.

FIG. 2 shows an example of topographical image to be shown on the monitor 9 when the battle action game is executed. The images of the scenes in the game are read out from the DVD-ROM 15 and displayed on the monitor 9. It is noted that the example image shown in FIG. 2 is simplified to ease the explanation and understanding, and actual characters and topography to be displayed on the monitor 9 in the actual game have more detailed designs.

In the topographical view in FIG. 2, the player-character 20 and the enemy characters 23 are positioned in the character movable area 25 (white area). In the character movable area 25, both of the player-character 20 and the enemy character 23 can move here and there. On the other hand, the hatched gray portions in FIG. 2 represent obstacle areas 27 wherein both of the player-character 20 and the enemy character 23 cannot exist and move (i.e., characters cannot be located in the obstacle areas 27). In the obstacle areas 27, various obstacles such as walls, fences, woods, cars, etc. are positioned, and those obstacles have their own heights, respectively.

On the topographical image thus displayed, the user controls the player-character 20 by the controller 12 to move within the character movable areas 25 with hiding the player-character 20 from the enemy characters 23 using the obstacles located in the obstacle areas 27. When the player-character 20 enters the visual field of the enemy character 23 (i.e., the player-character is found by the enemy character 23), the enemy character 23 may attack the player-character 20 with weapons or follow the player-character 20. When the enemy character 23 finds the player-character 23, the enemy character 23 may hides himself behind the obstacles to avoid the attack by the player-character 20.

In order to control the enemy character 23 to find, follow or hide himself from the player-character 20, the CPU 1 judges "whether or not the character is in the visual field of the other character" or "in which area the character can hide himself" based on the positional relationship between the player-character 20 and the enemy character 23 as well as the positional information of the obstacles and topography.

In the game system of the present invention, the above judgment is executed at the time of preparation and production of the topographic data to record information as to "how a character at a certain position can see another position or another character at another position". During the execution of the game, the CPU 1 merely refers to this information to execute the judgment, thus reducing the processing load of the CPU 1.

Figure 3:
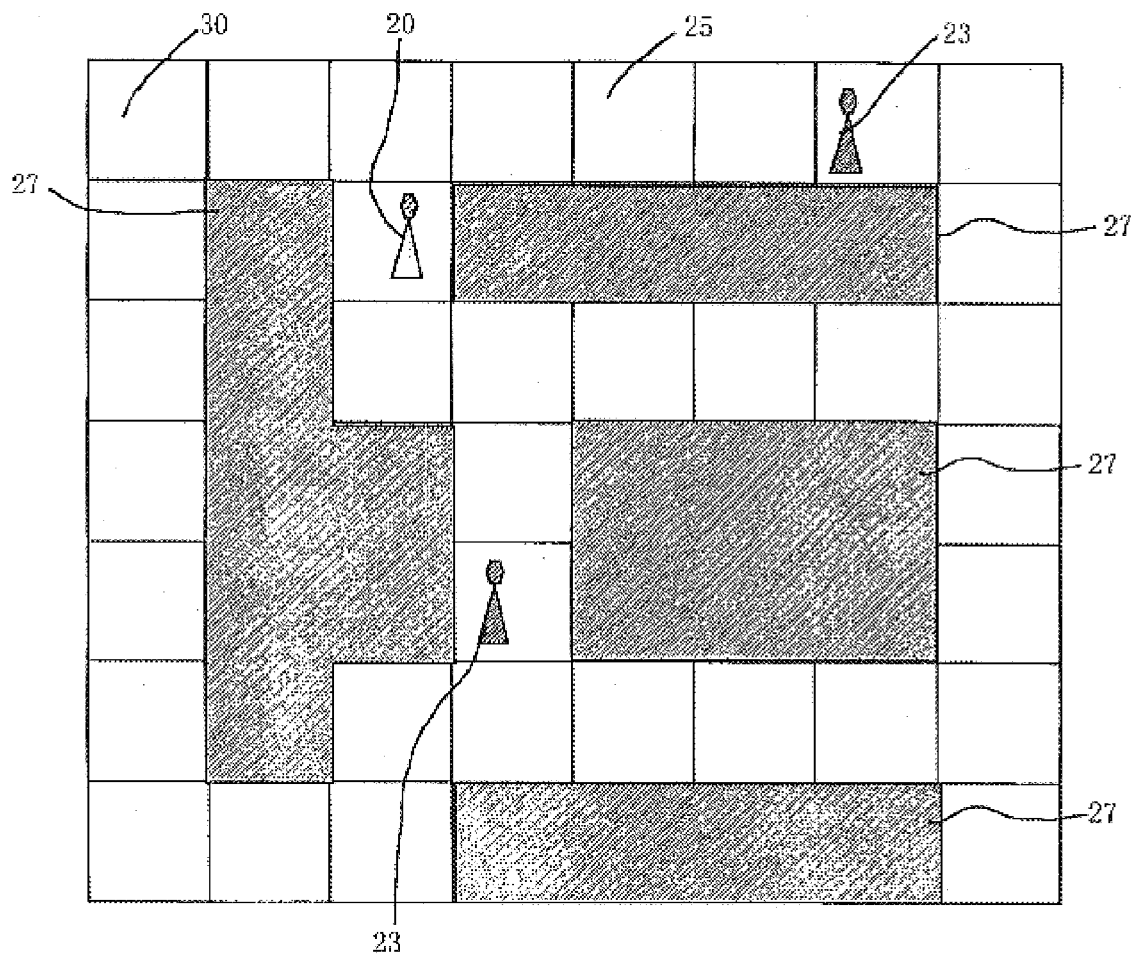
FIG. 3 is an example of a topographical image in which character movable area is divided into zones.
Figure 4:
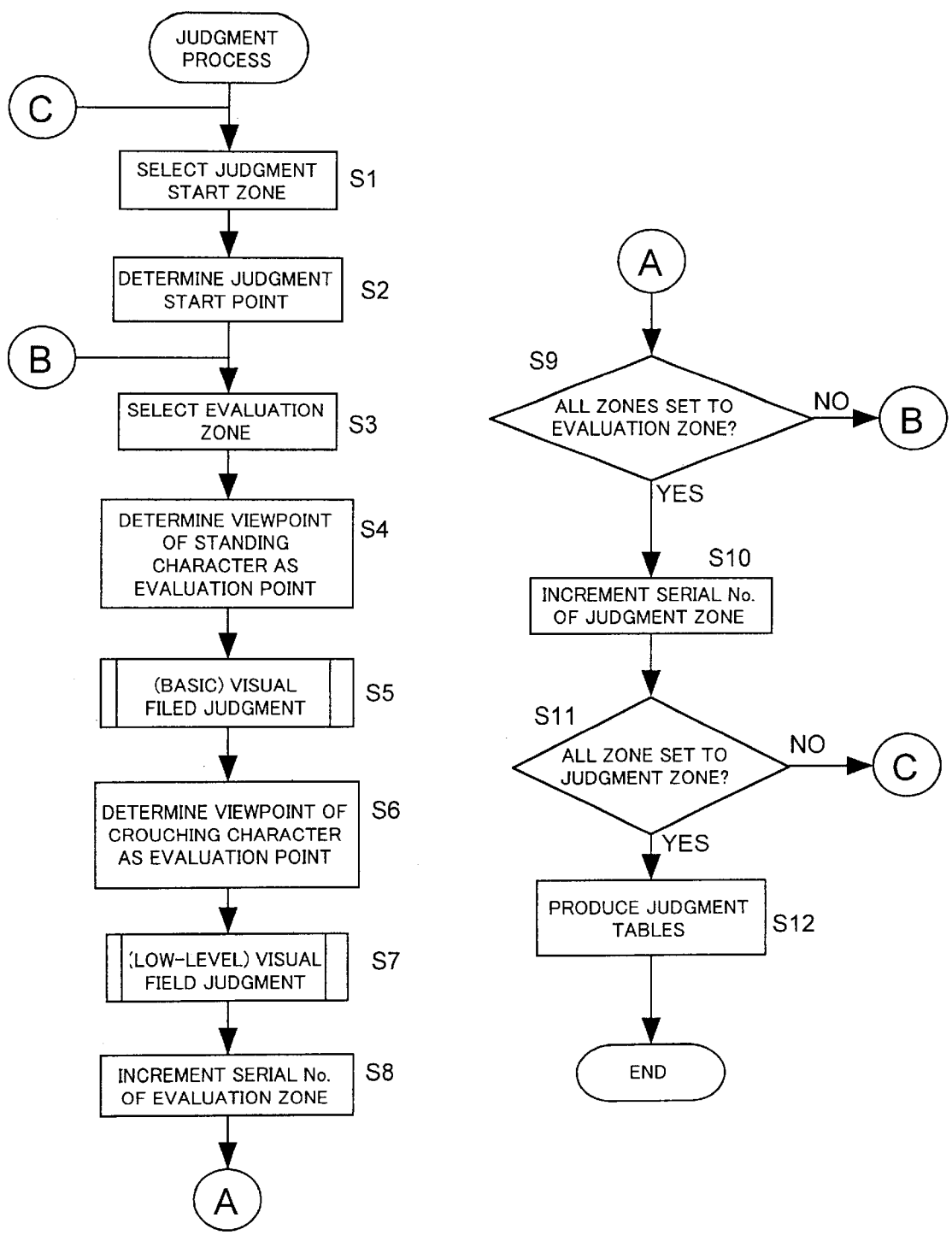
FIG. 4 is a flowchart showing a judgment process according to the present invention.

Next, the judgment process will be described below in detail with reference to FIGS. 3 to 8. In the game system of this invention, the character movable area 25 in FIG. 2 is divided into a plurality of rectangular zones 30 (hereinafter simply referred to as "zone 30") which are used as measure of position judgment. FIG. 3 shows an example of manner dividing the character movable area 25 into the zones 30. The zones 30 thus divided are not visualized on the monitor 9 for the user, but the CPU 1 recognizes them to execute the judgment process. Basically, no obstacles screening the view of the characters are positioned in the zones 30. In addition, the zones 30 are assigned with serial numbers, respectively, and each zone 30 is managed by its serial number.

When the CPU 1 starts executing the battle action game of the present invention, the topographic data as well as the position data of the player-character 20 and the enemy characters 23 are read out from the RAM 3. The CPU 1 starts the judgment process shown in FIGS. 4 and 5 based on the topographic data thus read out.

Figure 6:
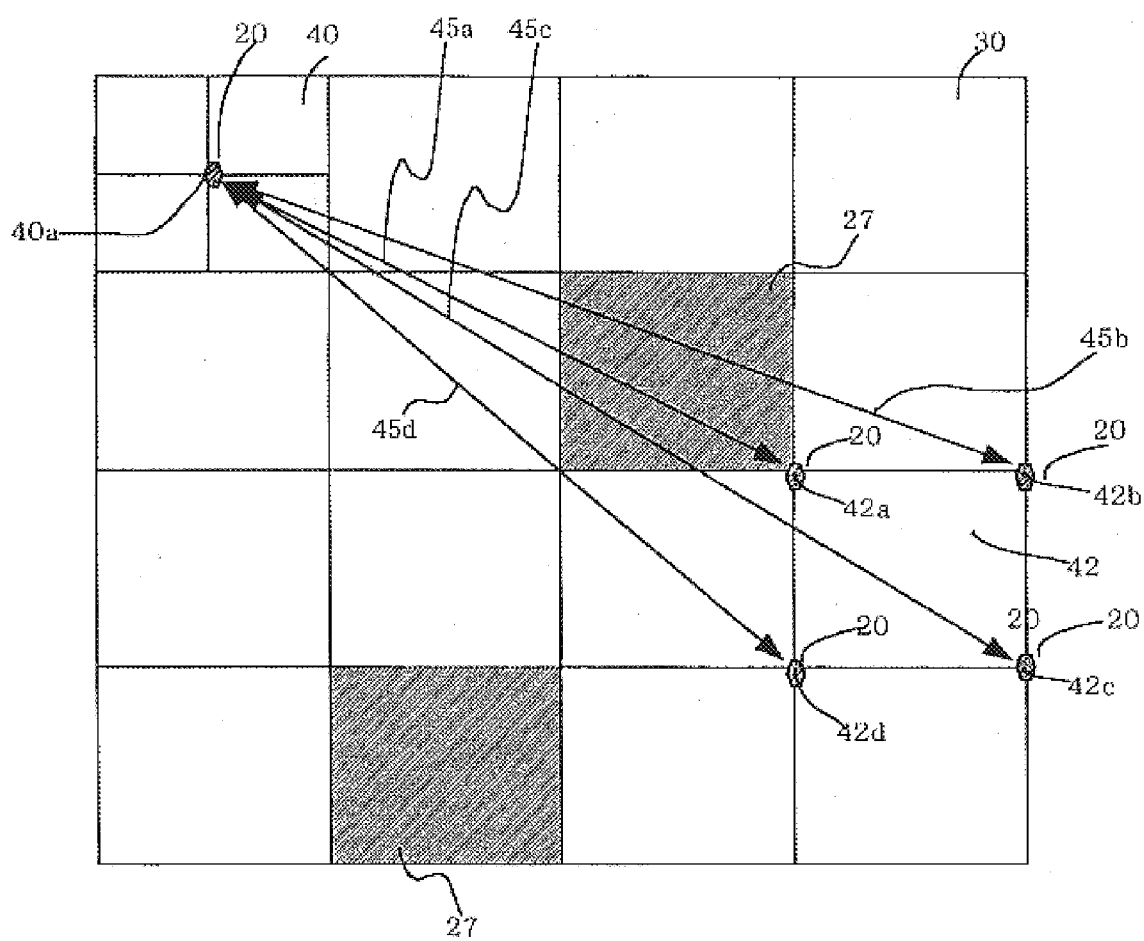
FIG. 6 is an example of topographical (field) data read-out from a RAM.

FIG. 6 shows an example of topographic data read out from the RAM 3. The character movable area 25 of the topographic data shown in FIG. 6 is divided into a plurality of zones 30 as described above with reference to FIG. 3. In the example shown in FIG. 6, fourteen zones 30 (because two obstacle areas 27 are shown) are shown. The hatched portions 27 in FIG. 6 are the obstacle areas 27 wherein the player-character 20 and the enemy characters 23 cannot exist and move, as described above with referring to FIG. 2. It is noted that the number of the zones 30 is not limited to fourteen as shown in FIG. 6, and more zones are provided in the actual game.

In FIG. 6, one of the zones 30 (e.g., a zone 30 having smallest serial number) is selected as a judgment start zone 40 (step S1). Then, a position of the viewpoint of the player-character 20 when the player-character 20 stands at the central coordinate point 40a within the judgment start zone 40 thus selected is determined as a judgment start point (step S2).

Then, one of the zones 30 other than the judgment start zone 40 (e.g., a zone 30 having a second smallest serial number) is selected as an evaluation zone 42 which is an object of the evaluation (step S3). Then, the positions of the viewpoints of the player-character 20 when the player-character 20 stands at the four corner coordinate points 42a to 42d in the evaluation zone 42 thus selected are determined as the evaluation points (step S4).

Figure 5:
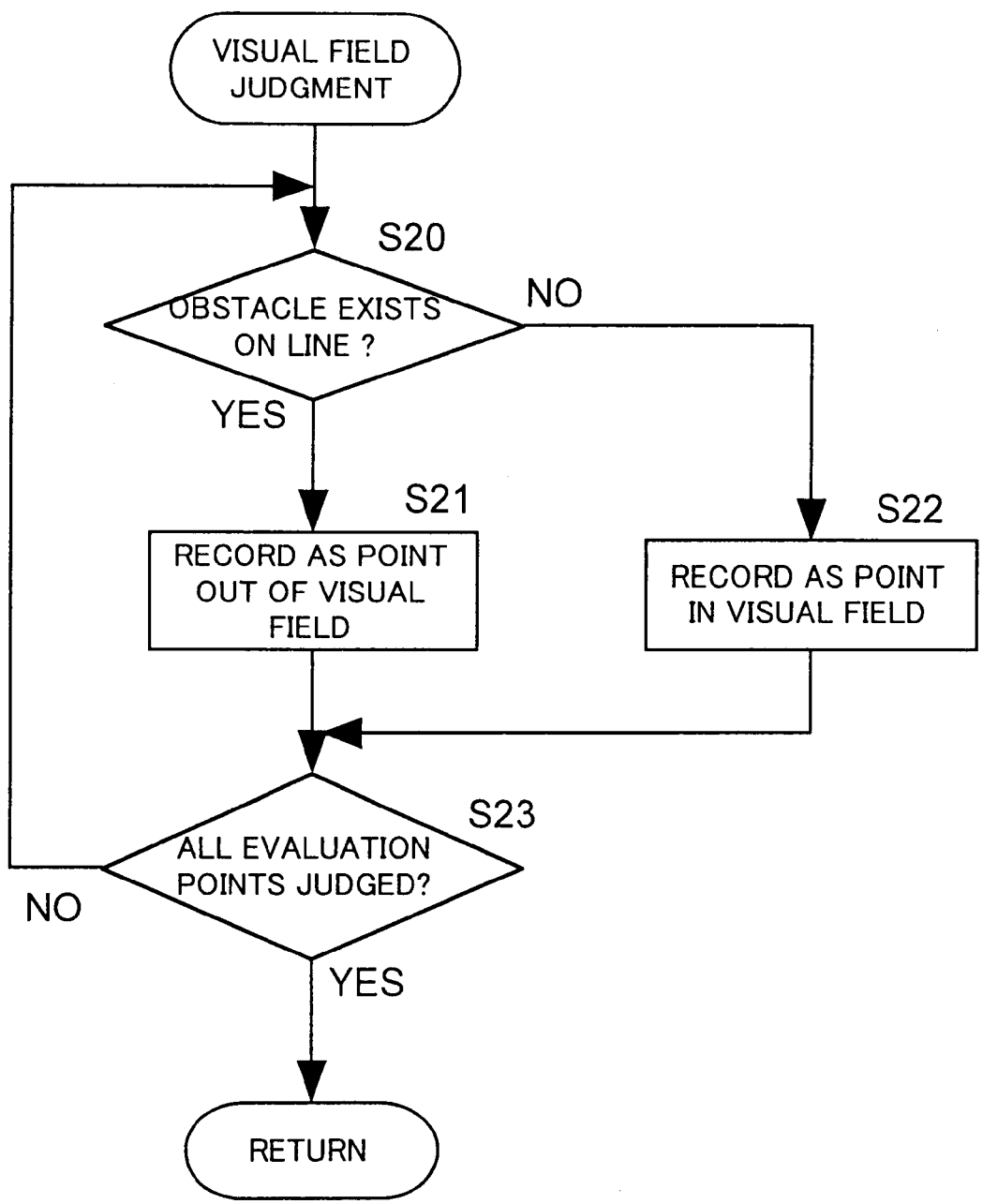
FIG. 5 is a flowchart showing a visual field judgment process shown in FIG. 4.

Next, the visual field judgment process shown in FIG. 5 is executed (step S5). In FIG. 5, it is determined whether or not any obstacle exists on a straight line 45a connecting the judgment start point (i.e., the viewpoint position of the player-character 20) at the central coordinate point 40a in the judgment start zone 40 and the evaluation point (i.e., the viewpoint position of the player-character 20) at the coordinate point 42a within the evaluation zone 42 (step S20; this will be hereinafter referred to as "basic visual field judgment"). As a result, the evaluation point for which the obstacle exists is recorded as "a point invisible (i.e., out of the visual field of the character) when the character is standing" (step S21). On the other hand, the evaluation point for which no obstacle exists is recorded as "a point visible (i.e., in the visual field of the character) when the character is standing" (step S22). Then, the basic visual field judgment is executed for other evaluation points of coordinate points 42b, 42c and 42d in the evaluation zone 42. Then, it is determined whether or not the basic visual field judgment is executed for all of the evaluation points of the coordinate points 42a to 42d in the evaluation zone 42 (step S23). If Yes, the process returns to the main routine shown in FIG. 4.

Figure 7A:
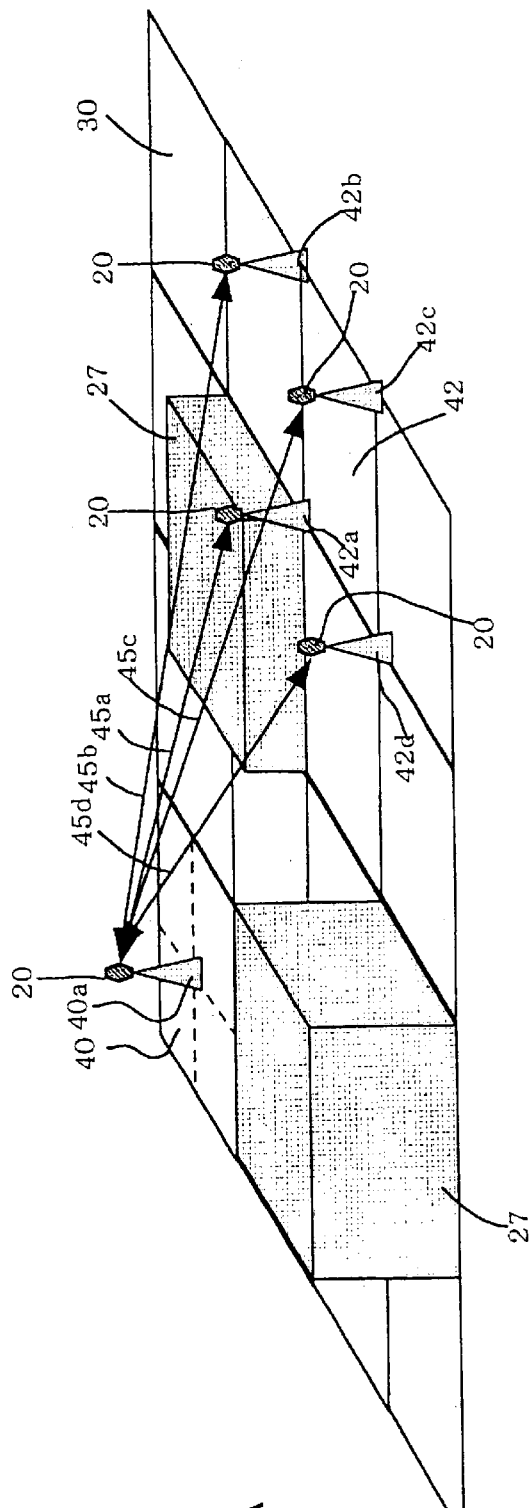
FIGS. 7A and 7B are examples of topographical (field) data at the time of basic visual field judgment.
Figure 7B:
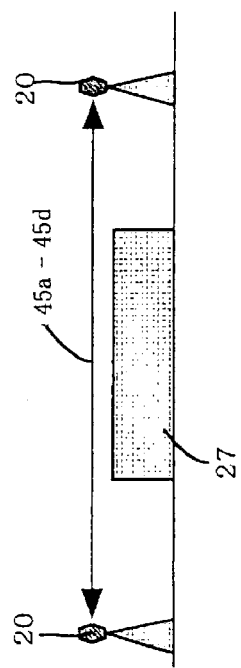

FIG. 7A is an example of the topographical data shown in FIG. 6 at the time of the basic visual field judgment and viewed from obliquely upside, and FIG. 7B is an example of the topographical data viewed horizontally. In the example shown in FIG. 7A, the obstacle 27 exists between the judgment start point at the central coordinate point 40a of the judgment start zone 40 and the respective evaluation points of the four corner coordinate points 42a to 42d of the evaluation zone 42. However, since the height of the obstacle 27 is lower than the visual line of the standing player-character 20, no obstacle exists on the straight lines 45a to 45d. Therefore, the respective evaluation points at the corner coordinate points 42a to 42d are recorded as "points visible (i.e., in the visual field of the character) when the character is standing".

Next, the positions of the viewpoints of the player-character 20 when the player-character 20 is taking low posture (the posture of the character sitting down or crouching) at the four corner coordinate positions 42a to 42d in the evaluation zones 42 selected in step S3 are determined as the evaluation points (step S6). Then, the visual field judgment process shown in FIG. 5 is executed like step S5 (step S7).

In the visual field judgment process in step S7, it is determined whether or not any obstacle exists on the straight lines 45a to 45d connecting the judgment start point at the central coordinate point 40a of the judgment start zone 40 (i.e., the position of the viewpoint of the standing player-character 20) and the evaluation points at the four corner coordinate points 42a to 42d of the evaluation zone 42, respectively (i.e., the points of the viewpoints of the player-character 20 taking low posture) (this will be hereinafter referred to as "low-level visual field judgment"). As a result, the evaluation point for which the obstacle exists is recorded as "the point invisible when the character is taking low posture (i.e., out of the visual field of the character)". On the other hand, the evaluation point for which no obstacle exists is recorded as "the point visible when the character is taking low posture (i.e., within the visual field of the character)".

Figure 8A:
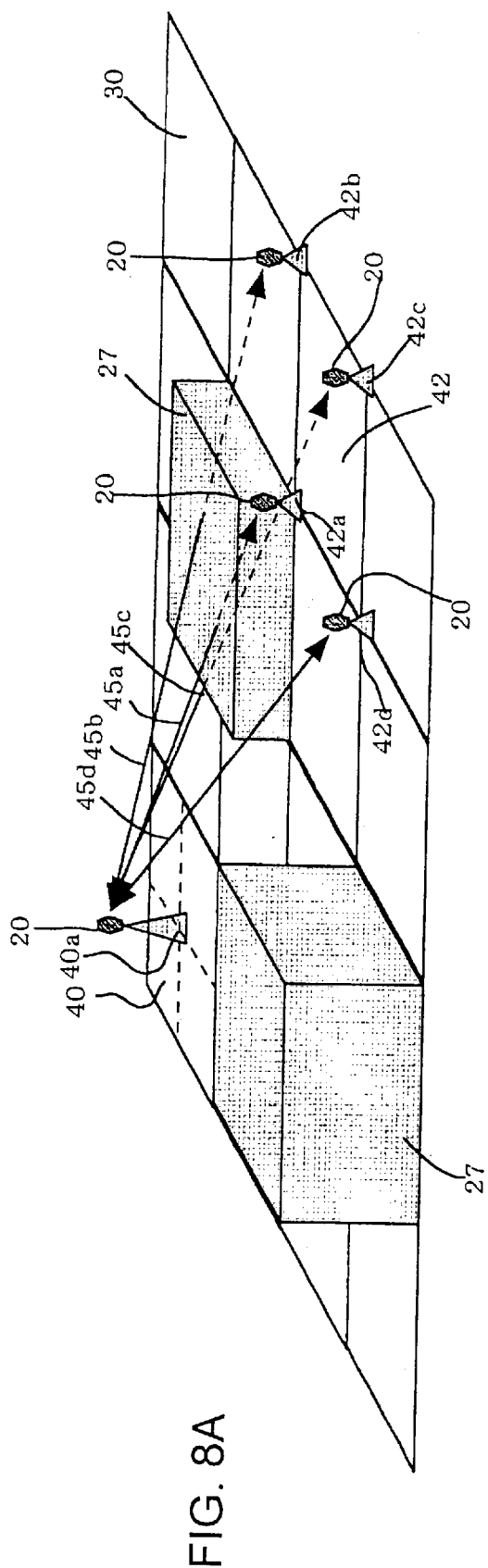
FIGS. 8A and 8B are examples of topographical (field) data at the time of low-level visual field judgment.
Figure 8B:
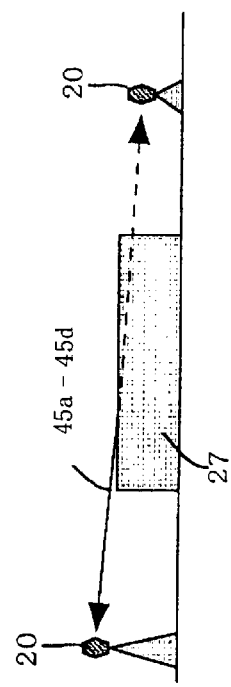

FIG. 8A shows an example of the topographic data of FIG. 6 at the time of the low-level visual field judgment and viewed from obliquely upside, and FIG. 8B is an example of the topographic data of FIG. 6 in horizontal view. In the example shown in FIG. 8A, the evaluation point at the coordinate point 42d of the evaluation zone 42 is the point visible even if the character is taking low posture, but the evaluation points at the coordinate points 42a to 42c of the evaluation zone 42 are the points invisible if the character is taking low posture. This is because no obstacle 27 exists between the judgment start point at 40a and the evaluation point at 42d as shown in FIG. 6. On the other hand, the obstacle 27 exists between the judgment start point 40a and the evaluation points at the coordinate points 42a to 42c, and the visual lines of the player-character 20 to the evaluation points at 42a to 42c are lower than the height of the obstacle 27 as shown in FIG. 8B. Hence, the straight lines 45a to 45c are screened by the obstacle 27.

When the low-level visual field judgment is completed in step S7, the serial number of the evaluation zone 42 is incremented by one (step S8). Then, it is determined whether or not the basic visual field judgment and the low-level visual field judgment are executed for all of the zones 30 other than the judgment start zone 40 (step S9). If the judgments are not completed for all of those zones 30, the process returns to step S3 to select next evaluation zone 42. Then, the process from step S4 to step S9 are executed for that evaluation zone 42 in the same manner. Thus, all zones 30 other than the judgment start zone 40 are selected and the judgments are executed, and the results are recorded. When the judgments for all zones 30 other than the judgment start zone 40 are completed, the process goes to step S10.

In step S10, the serial number of the judgment start zone 40 selected in step S1 is incremented by one. Then, it is determined whether or not the judgments are executed for all zones 30 as the judgment start zone 40 (step S11). If all zones 30 are not judged as the judgment start zone 40, the process returns to step S1 to select next judgment start zone 40. Then, the process of steps S2 to S11 are executed for that judgment zone 40. Thus, the judgment start zone 40 is changed one after another, and when all zones 30 are selected as the judgment start zone 40, a judgment table is produced with using the judgment results recorded in steps S5 and S7 as the bit flags of the judgment tables(step S12). Thus, the judgment process ends. When the judgment process ends, the GPU 4 draws the topography data and the character data on the frame buffer 5, and the image drawn on the frame buffer 5 is displayed on the monitor 9. After this, the game becomes ready to play.

In this way, judgment tables for the number of "number of zones X number of zones" are produced eventually. As described above, the judgment tables are referred to by the CPU 1 when the CPU 1 controls the enemy character 23 to find, follow or hide himself from the player-character 20.

Thus, by producing the judgment tables in advance and by referring to them, the CPU 1 may rapidly recognize whether or not the enemy characters 23 can presently see the player-character 20 and may rapidly obtain information as to which point in which zone 30 the enemy character should move to hide from the player-character 20 or whether or not the enemy character 23 can hide himself from the player-character 20 if he takes the low posture. In addition, since it is not necessary to execute judgment every time the character is moved, the processing load on the CPU 1 may be reduced and the enemy character 23 may take rapid and appropriate action.

For example, the enemy character 23 may temporarily take high posture (e.g., by standing up from the low posture) to be in the visible zone from the zone invisible from the player-character (i.e., the position judged as invisible from the position of the player-character 20) to attack the player-character 20 by weapon, and then again hide himself from the player-character 20 in the zone invisible from the player-character 20. Thus, the strategic interest in playing the game may be improved.

The above described judgment process may be executed, in advance, for the topographic portions which cannot be displayed in a single screen of the monitor 9 but becomes visible when the image on the monitor 9 is scrolled by the user operating the controller 12. Alternatively, it is possible to design the game system to execute the judgment process for only the area that can be displayed in a single image on the screen of the monitor 9, and the judgment process is executed every time other portion are displayed on the monitor 9 by the scroll operation by the user.

While the above description is made for the case where the judgment start zone 40 and the evaluation zone 42 have the same height levels, this invention is not limited to that case, and the above judgment is applicable to the case where the judgment start zone 40 and the evaluation zone 42 have different height levels.

Figure 9:
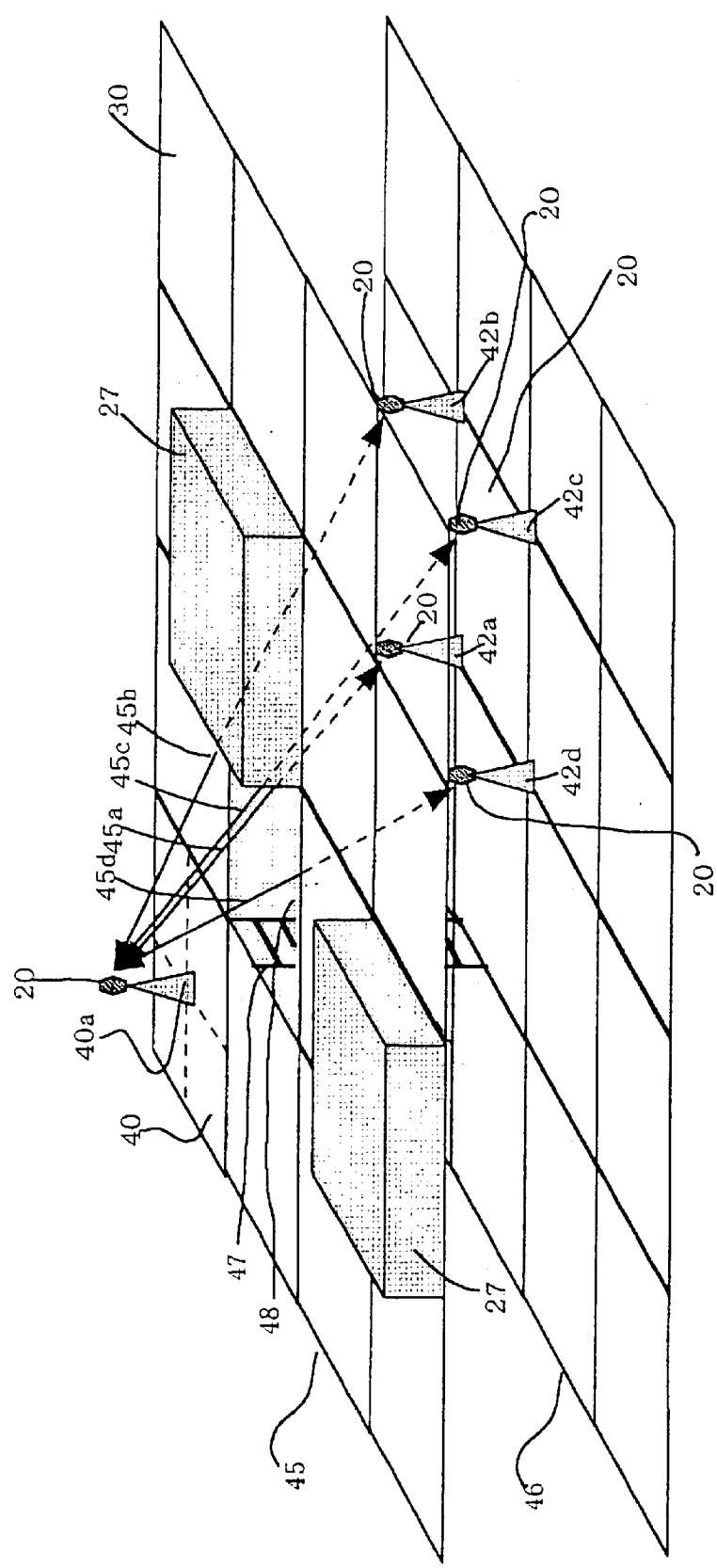
FIG. 9 is an explanatory view showing the judgment process executed when judgment start zone and evaluation zone have different heights.

FIG. 9 shows the judgment process executed when the judgment start zone 40 and the evaluation zone 42 have different height levels. In FIG. 9, the topography includes two floors, and the topography 45 of the first floor and the topography 46 of the second floor are connected by the ladder 47. During the game, the player-character 20 and the enemy characters 23 can move everywhere on the first and the second floors via the ladder 47. In the transparent area 48 shown in FIG. 9, the character can see the topography 46 of the second floor from the first floor and the topography 45 of the first floor from the second floor. The judgment process is executed through the transparent area 48.

In the example shown in FIG. 9, it is determined whether or not any obstacle exists on the straight lines 45a to 45d connecting the judgment start point at the central coordinate point 40a of the judgment start zone 40 and the evaluation points at the four corners 42a to 42d of the evaluation zone 42. Importantly, the obstacles in this case include the zones 30 themselves at the first floor, and the evaluation points that are screened by the zones 30 of the first floor are recorded as the "invisible point". However, the transparent area in the transparent or semi-transparent zone 30 does not screen the visual lines 45, and hence the evaluation points are recorded as "visible point". Also in the topography shown in FIG. 9, the judgment process (steps S1 to S12) is executed for all zones 30 including the topography 45 of the first floor and the topography 46 of the second floor to produce the judgment tables.

While the central coordinate point 40a of the judgment start zone 40 is set as the judgment start point in the above embodiment, any point within the judgment start zone 40 may be set as the judgment start point. In addition, plural judgment start points may be set. Further, while the judgment start point is set to the position of the viewpoint of the standing player-character, the judgment start point may be set to the position of the viewpoint of the player-character 20 sitting down, lying or jumping up, etc.

While the evaluation points are set to the four corner points 42a to 42d of the evaluation zone 42 in the above embodiment, any point within the evaluation zone 42 may be set to the evaluation points, and more than four evaluation points may be set. Further, while the evaluation point is set to the position of the viewpoint of the player-character in the standing or crouching posture, the evaluation point may be set to the position of the viewpoint of the player-character 20 lying or jumping up, etc.

In the above embodiment, the storage medium is a DVD-ROM 15. However, this invention is not limited by this example, and other storage medium such as CD-ROM, harddisk or semiconductor memory card and so on may be used as the storage medium. In such cases, a reading device which reads out information from those storage medium is connected to the game system.

Further, the application of the present invention is not limited to the action game. The present invention may be applied to game of various genres such as action simulation game and action role-playing game, etc. Furthermore, the present invention is applicable to various game systems such as a commercial game system and a portable game system.

As described above, according to the present invention, the judgment tables are produced in advance of starting the game. Since the computer in the game system can rapidly obtain information on the areas, e.g., where the character is visible, where the character is invisible, and where the character can be hidden, by referring to the judgment tables, the computer can control the characters to perform rapid and appropriate action with reduced processing load.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 2000-129836 filed on Apr. 28, 2000 including the specification, claims, drawings and summary is incorporated herein by reference in its entirety.

What is claimed is:

1. A game system comprising:
   a storage device for storing data of imaginary game field constituted by a plurality of areas to be displayed in scenes of a game; and
   a control device for advancing the game according a predetermined program and reading out the data of the imaginary game field from the storage device to produce images to be displayed, the control device comprising:
      judgment table producing means for judging whether or not an imaginary visual field of a character located in an area includes another character located in another area, for each area of all areas in the imaginary game field in which the character can be located, when the data of the imaginary game field is read out, and for producing judgment tables in advance of game play based on judgment results; and
      means for controlling action of the character located in the areas of the imaginary game field based on the judgment tables.

2. A game system according to claim 1, wherein the judgment table producing means comprises:
   a first means for selecting one of the areas of the imaginary game field in which the character can be located as a judgment start zone and for selecting one of a plurality of coordinate points within the judgment start zone as a judgment start point;
   a second means for selecting one of the areas of the imaginary game field, which is other than the one selected as the judgment start zone and in which the character can be located, as an evaluation zone and for selecting a predetermined number of coordinate points within the evaluation zone as evaluation points;
   a third means for judging, for the respective evaluation points, whether or not any obstacle exists on a straight line from the judgment start point to the evaluation point;
   a fourth means for recording the evaluation points, for which the judgment result by the third means indicates that obstacle exists on the straight line, as a point which is out of an imaginary visual field of the character located at the judgment start point and for recording the evaluation points, for which the judgment result by the third means indicates that obstacle does not exist on the straight line, as a point which is within the imaginary visual field of the character located at the judgment start point;
   a fifth means for selecting, in turn, all of the areas of the imaginary game field, which are other than the one selected as the judgment start zone and in which the character can be located, as the evaluation zone, and for selecting, in turn, all of the areas of the imaginary game field in which the character can be located as the judgment start zone; and
   a sixth means for producing the judgment tables based on results of the recording by the fourth means after all of the areas of the imaginary game field are selected as the judgment start zone.

3. A game system according to claim 2, wherein the judgment start point in the judgment start zone comprises a position of an imaginary viewpoint of the character when the character takes a high posture at the predetermined coordinate position in the judgment start zone.

4. A game system according to claim 2, wherein the predetermined coordinate point in the judgment start zone comprises a central coordinate point within the judgment start zone.

5. A game system according to claim 2, wherein the evaluation point in the evaluation zone comprises a point of imaginary viewpoint of the character when the character takes a high posture at the coordinate point in the evaluation zone.

6. A game system according to claim 2, wherein the evaluation point in the evaluation zone comprises a point of an imaginary viewpoint of the character when the character takes a low posture at the coordinate point in the evaluation zone.

7. A game system according to claim 2, wherein the judgment table producing means executes the judgment based on the imaginary viewpoints of the character when the character takes a high posture and a low posture at the coordinate point in the evaluation zone.

8. A game system according to claim 2, wherein the evaluation zone has a rectangular shape, and wherein the predetermined number of coordinate points in the evaluation zone comprise coordinate points of four corners of the evaluation zone having the rectangular shape.

9. A game system according to claim 2, wherein an imaginary height of the judgment start zone and an imaginary height of the evaluation zone within the imaginary game field are different from each other.

10. A judgment table producing method for a game system which reads out data of imaginary game field constituted by a plurality of areas to be displayed in scenes of a game to produce images to be displayed and controls action of a character located in the areas of the imaginary game field based on a produced judgment table when the data of the imaginary game field is read out, the method comprising the steps of:

selecting one of the areas of the imaginary game field in which the character can be located as a judgment start zone, and selecting one of a plurality of coordinate points within the judgment start zone as a judgment start point;

selecting one of the areas of the imaginary game field, which is other than the one selected as the judgment start zone and in which the character can be located, as an evaluation zone, and selecting a predetermined number of coordinate points within the evaluation zone as evaluation points;

judging, for the respective evaluation points, whether or not any obstacle exists on a straight line from the judgment start point to the evaluation point;

recording the evaluation points, for which the judgment result indicates that obstacle exists on the straight line, as a point which is out of an imaginary visual field of the character located at the judgment start point, and recording the evaluation points, for which the judgment result indicates that obstacle does not exist on the straight line, as a point which is within the imaginary visual field of the character located at the judgment start point;

selecting, in turn, all of the areas of the imaginary game field, which are other than the judgment start zone and in which the character can be located, as the evaluation zone, and selecting, in turn, all of the areas of the imaginary game field in which the character can be located as the judgment start zone; and producing judgment tables in advance of game play based on results of the recording by the recording step after all of the areas of the imaginary game field are selected as the judgment start zone.

11. A computer-readable storage medium carrying a program which allows a computer in a game system to read out data of an imaginary game field constituted by a plurality of areas to be displayed in scenes of a game from a storage device to display images, the program controlling the computer to function as:

judgment table producing means for judging whether or not an imaginary visual field of a character located in an area includes another character located in another area, for each area of all areas in the imaginary game field in which the character can be located, when the data of the imaginary game field is read out, and for producing judgment tables in advance of game play based on judgment results; and means for controlling action of the character located in the areas of the imaginary game field based on the judgment tables.

12. A storage medium according to claim 11, wherein the judgment table producing means comprises:

a first means for selecting one of the areas of the imaginary game field in which the character can be located as a judgment start zone and for selecting one of a plurality of coordinate points within the judgment start zone as a judgment start point;

a second means for selecting one of the areas of the imaginary game field, which is other tan the one selected as the judgment start zone and in which the character can be located, as an evaluation zone and for selecting a predetermined number of coordinate points within the the respective evaluation points, whether or not any obstacle exists on a straight line from the judgment start point to the evaluation point;

a fourth means for recording the evaluation points, for which the judgment result by the third means indicates that obstacle exists on the straight line, as a point which is out of an imaginary visual field of the character located at the judgment start point and for recording the evaluation points, for which the judgment result by the third means indicates that obstacle does not exist on the straight line, as a point which is within the imaginary visual field of the character located at the judgment start point;

a fifth means for selecting, in turn, all of the areas of the imaginary game field, which are other than the one selected as the judgment start zone and in which the character can be located, as the evaluation zone, and for selecting, in turn, all of the areas of the imaginary game field in which the character can be located as the judgment stan zone; and a sixth means for producing the judgment tables based on results of the recording by the fourth means after all of the areas of the imaginary game field are selected as the judgment start zone.

13. A storage medium according to claim 12, wherein the judgment start point in the judgment start zone comprises a position of an imaginary viewpoint of the character when the character takes a high posture at the predetermined coordinate position in the judgment start zone.

14. A storage medium according to claim 12, wherein the predetermined coordinate point in the judgment start zone comprises a central coordinate point of the judgment start zone.

15. A storage medium according to claim 12, wherein the evaluation paint in the evaluation zone comprises a point of an imaginary viewpoint of the character when the character takes a high posture at the coordinate point in the evaluation zone.

16. A storage medium according to claim 12, wherein the evaluation point in the evaluation zone comprises a point of an imaginary viewpoint of the character when the character takes a low posture at the coordinate point in the evaluation zone.

17. A storage medium according to claim 12, wherein the judgment table producing means executes the judgment based on the imaginary viewpoints of the character when the character takes a high posture and a low posture at the coordinate point in the evaluation zone.

18. A storage medium according to claim 12, wherein the evaluation zone has a rectangular shape, and wherein the predetermined number of coordinate points in the evaluation zone comprise coordinate points of four corners of the evaluation zone having the rectangular shape.

19. A storage medium according to claim 12, wherein an imaginary height of the judgment start zone and an imaginary height of the evaluation zone within the imaginary game field are different from each other.

* * * * *